United States Patent Office 3,362,903
Patented Jan. 9, 1968

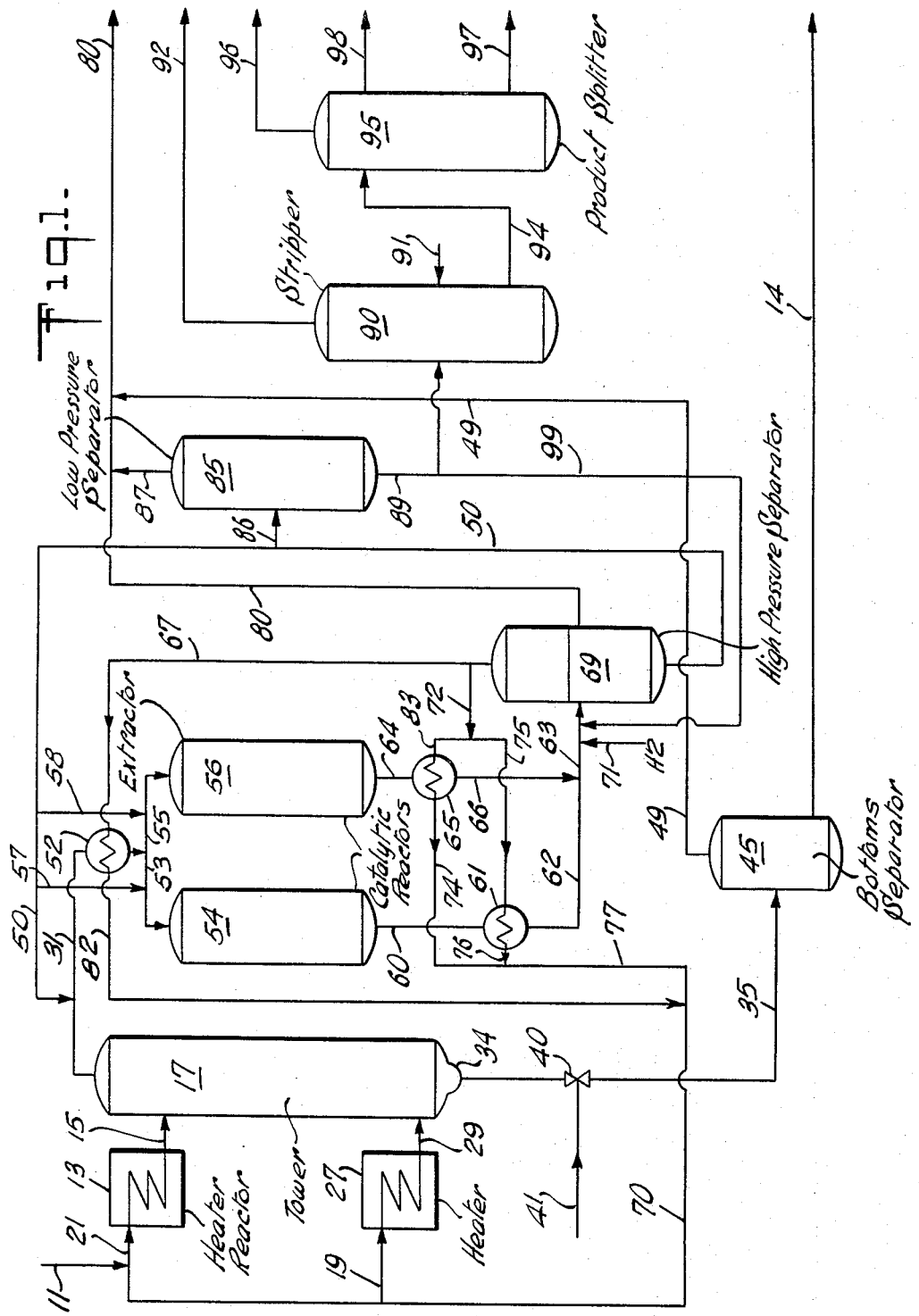

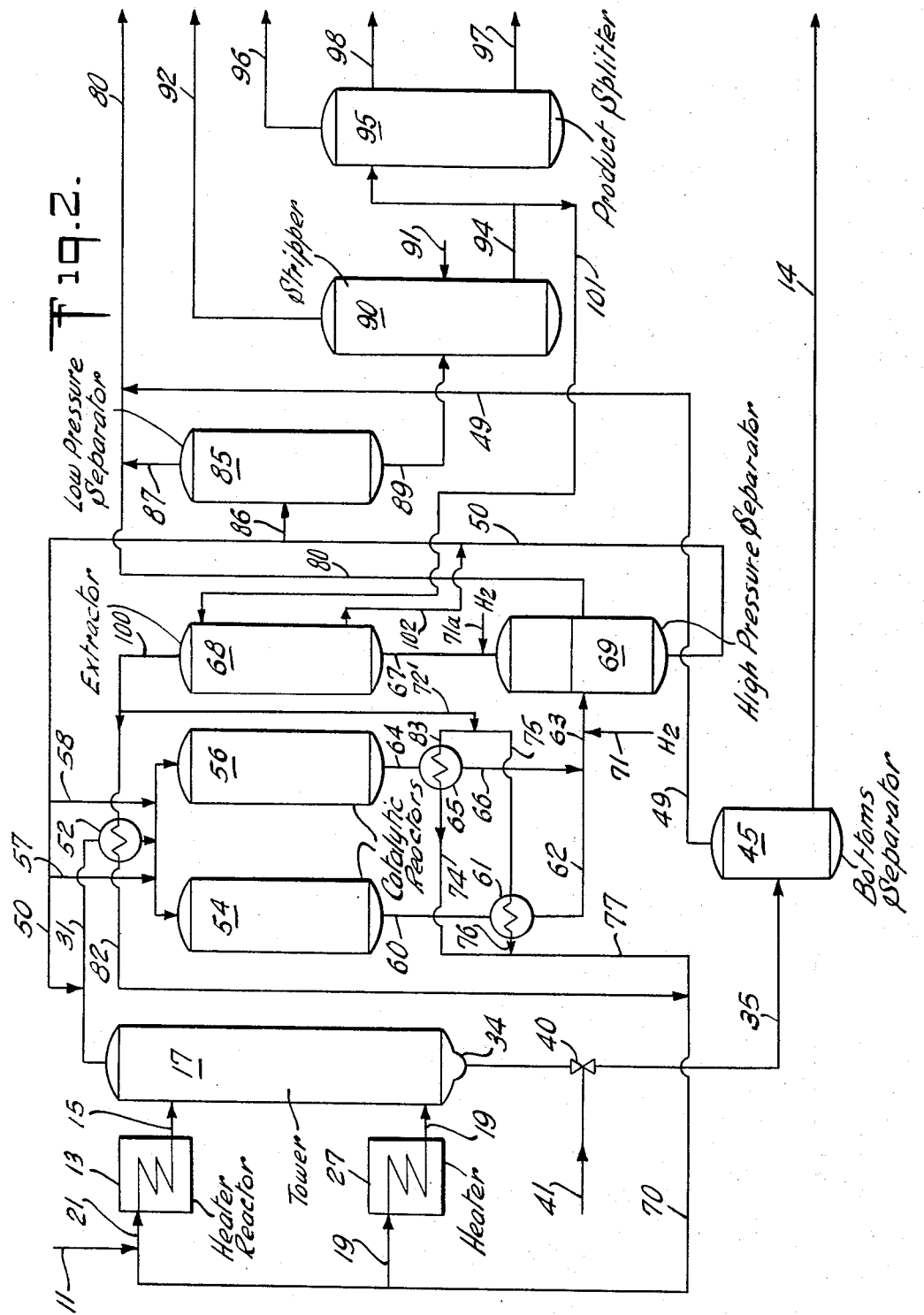

3,362,903
HYDROGEN PURIFICATION IN HYDRO-CONVERSION PROCESSES
Du Bois Eastman, deceased, late of Whittier, Calif., by Security First National Bank, executor, Los Angeles, Calif., and Warren G. Schlinger, Pasadena, Calif., assignors to Texaco Inc., New York, N.Y., a corporation of Delaware
Filed Aug. 17, 1964, Ser. No. 391,072
1 Claim. (Cl. 208—143)

ABSTRACT OF THE DISCLOSURE

Removal of light gaseous hydrocarbon impurities from the recirculating hydrogen stream in hydroconversion processes in which there is a net consumption of hydrogen, whereby a low purity hydrogen make-up stream-containing substantial quantities of gaseous hydrocarbons and gas-free liquid hydrocarbons recycled from the product recovery section of the process are introduced into the effluent from the hydroconversion reaction, the combined stream is subjected to high pressure flash vaporization and the light gaseous hydrocarbons are removed in the liquid hydrocarbons recovered from the high pressure flash vaporizer.

---

This invention relates to hydroconversion processes. More particularly, it is concerned with catalytic hydrogenation processes in which there is a net consumption of hydrogen by chemical reaction. In its more specific aspect, it is concerned with a method for purifying the hydrogen charged to the hydrogenation reaction zone.

Various hydroconversion processes are known in the art for the treatment of hydrocarbons. Typical processes for the treatment of hydrocarbons with hydrogen gas in the presence of a catalyst and wherein there is a net consumption of hydrogen by chemical reaction include hydrotreating, hydrofinishing, hydrocracking, and a wide variety of other processes in which hydrocarbon stocks are treated with hydrogen to improve product quality and stability. Although these processes differ in the charge stock employed, the severity of operating conditions and the product obtained, nevertheless they have the common feature of carrying out the hydrogenation reaction in the presence of an excess of hydrogen, a portion of which hydrogen is derived by recycling hydrogen separated from the reactor effluent and another portion of which is derived from hydrogen added to the system as continuous make-up to replace the hydrogen consumed in the reaction. This make-up hydrogen is usually derived from an extraneous source and the purity of the make-up hydrogen can vary widely depending on the source and purification treatment it has received. As a rule, the purer the hydrogen stream, the more costly is its preparation.

As an example of a hydrogenation process of the type described above, reference may be made to U.S. Patent No. 3,089,843 which issued to us on May 14, 1963. This patent relates to the conversion of crude oils or hydrocarbon oils containing heavy materials into distillate products substantially free from sulfur, nitrogen, metals and ash, and gum-forming constituents. It involves the treatment of heavy hydrocarbons under conditions of elevated temperature and pressure in the presence of hydrogen, a portion of which is consumed, and it requires the recirculation of substantial quantities of hydrogen.

In order to maintain a desired purity of the recirculating hydrogen stream in an operation of the type described, the make-up hydrogen stream supplied is usually of relatively high hydrogen purity, for example, in excess of 90% hydrogen content and preferably above 95% hydrogen content. To supply such a high purity make-up hydrogen stream requires either expensive and extensive faciliities for manufacturing the hydrogen, as by electrolysis of water or the partial combustion of hydrocarbons with substantially pure oxygen, or it requires elaborate equipment for the removal of impurities from hydrogen streams of low purity such as are normally available in a petroleum refinery from catalytic reforming and similar hydrogen-producing processes.

In accordance with the present invention, it is possible to employ relatively low purity hydrogen as make-up in hydrogenation processes requiring supplemental hydrogen. In order to acomplish this we introduce the make-up hydrogen stream into the recycle hydrogen stream and contact the combined stream with a portion of the liquid product from the process. Thus, the make-up hydrogen stream may be introduced into the reactor effluent stream containing hydrocarbons, hydrogen to be recycled, and other gases, ahead of a high pressure gas separator, and recycled liquid product may be introduced into the high pressure separator with the result that impurities introduced into the system with the make-up hydrogen in the form of gaseous hydrocarbons are absorbed by the additional volume of recirculated liquid and are thus removed from the recycle hydrogen stream. We may, however, prefer to add an absorption vessel in the recycle hydrogen discharge line from the high pressure separator and contact the hydrogen stream with the liquid product in this vessel. When using such an absorption vessel, we can also operate successfully by introducing make-up hydrogen into the discharge line from the separator in addition to or instead of into the reactor effluent stream.

In the accompanying drawings:
FIG. 1 represents diagrammatically a flow scheme for a typical hydrogenation process incorporating the features of the present invention; and
FIG. 2 represents diagrammatically a modification of the flow scheme of FIG. 1.

Referring to FIG. 1, charge oil from line 11 is mixed with a large excess of hydrogen in line 21 under elevated pressure and the mixture is introduced into heater 13 wherein it is passed through a coil and heated indirectly by oil or gas combustion. Temperatures within the coil are maintained between about 700° F. and 950° F. and heat heating coil outlet pressure is advantageously maintained within the range of 1400 to 2000 p.s.i.g., although pressures ranging from as low as 1000 p.s.i.g. to as high as 5,000 p.s.i.g. may be employed.

Under the conditions of the temperature, hydrogen to oil ratio, contact time, pressure and turbulence existing in the heating the higher boiling hydrocarbons are subjected to viscosity breaking with substantial immediate hydrogenation of the molecular fragments and without further breakdown, thereby materially increasing the production of middle distillates without substantial increase in lower boiling gasoline range materials and without substantial formation of normally gaseous hydrocarbons and heavy tars and coke. As the reaction proceeds, the molecular fragments, because of their lower boiling characteristics, are substantially immediately vaporized.

The hot mixture of hydrogen, vaporized hydrocarbons and liquid oil leaves heater 13 by means of line 15 and is introduced immediately into the upper section of tower 17. This upper section serves as a disengaging zone to separate gasiform materials comprising vaporous hydrocarbons and hydrogen from the liquid oil. The gasiform materials leave tower 17 through line 31 and the disengaged liquid flows downwardly through tower 17.

A separate hydrogen stream is passed through line 19 to heater 27 wherein the hydrogen is heated indirectly as by oil or gas combustion to an elevated temperature between about 800° F. and 900° F. while maintaining the outlet pressure of heater 27 substantially the same as the outlet pressure of heater 13. The hot hydrogen passes continuously from heater 27 through line 29 to the lower section of tower 17 at a point spaced above the bottom of the tower. The pressure within tower 17 is maintained at approximately the pressure of lines 15 and 29, advantageously within the range of 1400 to 2000 p.s.i.g. The disengaged liquid oil which has been separated from the vaporous hydrocarbons and hydrogen in the disengaging zone in the upper section of tower 17 flows downwardly and during its passage to the bottom of the tower is brought into intimate contact with the separately heated stream of hydrogen entering the lower part of tower 17 through line 29. Under the conditions of temperature, pressure and ratio of hydrogen to oil some further cracking and viscosity breaking takes place with hydrogenation of the unsaturated fragments, the overall effect being the production of additional oil vapors and the reduction of the liquid oil to a heavy residuum containing substantially all of the metal and ash-forming constituents of the original charge oil. The vaporized portion of the downwardly flowing oil is swept upwardly by the unreacted hydrogen and passes through the tower and out of the upper portion thereof through line 31 with the vaporous hydrocarbons and the hydrogen separated from the liquid phase oil in the disengaging zone.

The remaining liquid hydrocarbons flow downwardly through tower 17 below the point of entry of line 29 and collect as a residual liquid fraction in boot 34 from which it may be withdrawn continuously or intermittently.

The bottoms are withdrawn through line 35 and while passing through pressure level control valve 40 are cooled by the introduction of cutter oil, advantageously a light petroleum oil, through line 41. The mixture of bottoms and cutter oil is then introduced into bottoms separator 45 where small amounts of entrained or dissolved gaseous materials are separated. The separator bottoms are removed through line 14 and may be sent to storage or subjected to further treatment. Overhead from bottoms separator 45 is removed through line 49.

Overhead from tower 17 comprising a mixture of hydrogen and vaporous hydrocarbons is withdrawn through line 31 and is cooled to a temperature of about 820–840° F. by the addition of a portion of condensed product from line 50. The mixture is further cooled by indirect heat exchange with recycle hydrogen in exchanger 52. The mixture is then split into two substantially equal streams, one stream being introduced into hydrogenation reactor 54 through line 53 and the other stream being introduced into hydrogenation reactor 56 through line 55.

Reactors 54 and 56, which are operated in parallel, contain a bed of suitable hydrogenation catalyst, such as cobalt molybdate on alumina. In these reactors the sulfur and nitrogen compounds present in the reactor feed are converted respectively into hydrogen sulfide and ammonia and unsaturated gum-forming constituents are hydrogenated to stable compounds.

Effluent from hydrogenation reactor 54 passes through line 60, heat exchanger 61 and lines 62 and 63 to high pressure separator 69. Effluent from hydrogenation reactor 56 passes through line 64, heat exchanger 65 and lines 66 and 63 to high pressure separator 69. High pressure separator 69, although depicted as one vessel actually contains two chambers the lower chamber acting as a separating chamber and the upper chamber as an amine scrubber. However, for convenience the vessel is referred to simply as a high pressure separator. Reactor effluent is introduced into the lower chamber of high pressure separator 69. In the lower chamber, which is maintained at a pressure substantially that of reactors 54 and 56 but at a temperature only slightly over 100° F., a separation is made between liquid and vaporous material. The vaporous material comprising hydrogen, hydrogen sulfide and light hydrocarbon gases then passes upwardly through the upper chamber of high pressure separator 69 where scrubbing with an amine solution effectively removes the hydrogen sulfide. A hydrogen-rich gas essentially free from hydrogen sulfide is removed from the high pressure separator 69 through line 67. To prevent a build-up of gaseous impurities, a bleed stream is withdrawn through line 80.

A portion of this hydrogen-rich gas is recycled through heat exchanger 52, lines 82 and 70 and is sent to heaters 13 and 27 through lines 21 and 19 respectively. A separate portion of the hydrogen-rich gas is withdrawn from line 67 through line 72, and is then split into two streams, one stream passing through line 75, heat exchanger 61 and lines 76 and 77 to be combined with recycled hydrogen from line 82. The other stream passes through line 83, heat exchanger 65, lines 74 and 77 to be combined with recycled hydrogen from line 82.

The liquid product is withdrawn from high pressure separator 69 through line 50 and a portion, sufficient to cool the overhead from tower 17 about 30° F. is introduced into line 31. If necessary, sufficient product may also be sent through lines 57 and 58 to cool the feed to reactors 54 and 56 to a temperature below 800° F. The balance of the product liquid is sent to low pressure separator 85 through line 86. From the low pressure separator 85 which is operated at a temperature slightly over 100° F. and a pressure in the neighborhood of 450 p.s.i.g. uncondensed gases pass through line 87 and combine with the bleed stream in line 80. Product liquid from low pressure separator is removed through line 89 and part of it is sent to stripper 90. Steam introduced through line 91 expedites the removal of dissolved $H_2S$ from the hydrocarbons and the $H_2S$ containing stream is removed overhead through line 92. Liquid from $H_2S$ stripper 90 is sent through line 94 to product splitter 95 which may be a flash tower from which naphtha is removed overhead through line 96 and the balance of the product through line 97 or as a distillation column from which naphtha, kerosene and middle distillates are removed through lines 96, 98 and 97 respectively.

Make-up hydrogen is introduced through line 71 into the total product stream from reactors 54 and 56 at the inlet to high pressure separator 69.

The remainder of the liquid product from the low pressure separator 85 is recycled to the inlet to high pressure separator 69 through line 99. Being a relatively cool liquid, the recycled liquid product helps to condense the hydrocarbons in separator 69 and dissolves any uncondensed hydrocarbons leaving the combined hydrogen stream in a reasonably pure state for discharge through outlet conduits 67 and 72.

Since hydrogen is consumed in the course of this hydroconversion operation, it is necessary to supply continuously the stream of make-up hydrogen through line 71. The described procedure makes it possible to maintain the desired purity of the recirculating hydrogen stream in the process without it being necessary that the make-up hydrogen stream be of relatively high purity, for example in excess of 90% hydrogen concentration and preferably above 95%.

FIG. 2 shows an alternative method of incorporating the principles of the subject invention in the process of FIG. 1. In FIG. 2, an extractor 68 is connected to the top of high pressure separator 69 by means of line 67 to receive total hydrogen, and thence through line 100 and exchanger 52 to line 82, and through line 72′ to line 70, to deliver purified hydrogen back to the initial stages as in FIG. 1. Line 101 connects line 94, the liquid product draw-off line from stripper 90, to the upper portion of extractor 68 to supply a part of the liquid product for washing the hydrogen. Outlet line 102 connects the bottom portion of extractor 68 to line 50, the liquid draw-off line from high pressure separator 69, to deliver used wash liquid thereto. In this manner, a portion of the stripped liquid product from stripper 90 is recycled to the extractor 68 where it contacts the combined recycle and make-up hydrogen stream for the removal of impurities therefrom. Part of the used wash liquid from the extractor 68 is then charged through lines 102 and 86 to low pressure separator 85 where the extracted vapors are removed; the rest passing by way of lines 50, 57 and 58 to the effluent from tower 17.

If desired, the make-up hydrogen may be introduced through line 71a into the overhead outlet line 67 from high pressure separator 69. The recycle hydrogen mixes with the recycle hydrogen from the high pressure separator 69 and the combined stream is contacted with stripped liquid product from stripper 90 in extractor 68 for removal of impurities therefrom.

*Examples*

The operating conditions for each of the following three examples are shown in Table I. Table II lists the operating conditions and results which are not common to the three examples. Table III lists various gas analyses. A 15.6° API Reduced California Crude is charged through line 11 to the hydroconversion process at a rate of 1.7 barrels per hour. To this feed oil stream is added the indicated quantity of total hydrogen stream which comprises a combination of recycle hydrogen and make-up hydrogen. This hydrogen and oil mixture is passed through line 21 under conditions of highly turbulent flow through a coil at an average reaction temperature of 861° F. and a pressure of 1500 p.s.i.g. Under these conditions, significant cracking and hydrogenation reactions occur, and the resulting hot mixture of hydrogen, vaporized hydrocarbons and liquid oil which leaves this heater coil is introduced into the upper section of a stripping tower 17. The gasiform materials are withdrawn overhead from the stripper tower through line 31, and the liquid oil flows downwardly through the tower. A separate hydrogen stream, also comprising a combination of recycle hydrogen and make-up hydrogen, is heated in a separate heater 27 to a temperature of 853° F. and introduced in the quantities indicated in the table into the bottom of the stripper tower 17.

The overhead stream from the tower, comprising a mixture of hydrogen and vaporous hydrogen and vaporous hydrocarbons, is cooled to a temperature of about 740° F. by the addition of a portion of condensed product and introduced into hydrogenation reactors 54 and 56 containing a cobalt molybdate on alumina hydrogenation catalyst.

The effluent from the hydrogenation reactor is indirectly cooled to 120° F. and directed to a high pressure separator vessel 69, operated at substantially the same pressure as prevailed in the preceding parts of the hydroconversion system. To this effluent is added the make-up hydrogen stream from line 71 to make a total hydrogen stream.

The liquid product from the high pressure separator vessel is withdrawn from the bottom of the high pressure separator and directed to a low pressure separator 85 wherein the pressure is reduced from the hydroconversion operating level of 1500 p.s.i.g. to 160 p.s.i.g. At this lower pressure, the dissolved gases are flashed into vapor, and a gaseous stream called tail gas is withdrawn overhead from the separator vessel. Although still containing substantial quantities of hydrogen, this gas stream is principally composed of light gaseous hydrocarbons and is directed into the refinery fuel gas system.

Liquid is withdrawn from the bottom of the low pressure separator and constitutes the product from the hydroconversion operation, having a 29.6° API gravity and a much lower viscosity, carbon residue and sulfur content than the original feed oil. It is substantially free of any metal or ash-forming constituents, as they are concentrated in and discharged from the processing system in the product tar, of 0.6° API gravity and 31.7% carbon residue, which is withdrawn from the bottom of the stripper tower 17.

In Example 1 is shown a hydroconversion operation conducted in accordance with the prior art wherein a high purity hydrogen make-up stream is supplied to the operation. 1203 standard cubic feet per hour of a 96.8% purity hydrogen stream are added to the system by introduction into the recycle hydrogen stream withdrawn overhead from the high pressure separator 69. This produces a total hydrogen stream for recycle purposes which contains 81.7 volume percent hydrogen and which is divided between the oil and hydrogen heaters in the quantities indicated. A tail gas stream in the amount of 186 standard cubic feet per hour is withdrawn from the low pressure separator.

In Example 2, a 58.3 volume percent hydrogen stream obtained from the off-gas of a catalytic reforming operation is supplied to the hydroconversion system in the quantity of 1998 standard cubic feet per hour which provides the hydroconversion operation with the same quantity of actual (100%) hydrogen as was provided in Example 1. In this example, the make-up hydrogen is introduced into the line 63 ahead of the high pressure separator 69. In addition, a total of 12.96 barrels per hour of low pressure separator liquid product are returned to the high pressure separator through line 99. When this type of operation is practiced, the total hydrogen stream available for recycle is found to have the same 81.7 volume percent hydrogen purity as is the case in Example 1 where a much higher purity make-up hydrogen is employed. The quantity of this total hydrogen stream is substantially equivalent to that of Example 1 and is distributed between the oil and hydrogen heaters in approximately the same proportions as in Example 1. A better idea of the efficacy of this practice of the invention may be realized if one considers that a make-up hydrogen stream of 97.4 percent hydrogen purity would have to be supplied to a hydroconversion system operating in the same manner as in Example 1 to produce the results of Example 2. The same product yields and quality are obtained in Example 2 as in Example 1.

In Example 3, the same low purity make-up hydrogen stream as in Example 2 is supplied to the system ahead of the high pressure separator 69. Further, as shown in FIG. 2, 12.96 barrels per hour of the low pressure separator liquid is recirculated through line 99 to the top of a separate extractor vessel 68 into the bottom of which the recycle hydrogen stream is introduced. A total hydrogen stream is produced overhead from the extractor tower 68 or with a hydrogen purity of 81.8 volume percent. The quantity of this total hydrogen stream is substantially the same as in Example 2, as is its distribution between the oil and hydrogen heaters. Comparable product yields and quality are obtained.

To produce an equivalent result in the conventional operation typified by Example 1, would require supplying a make-up hydrogen stream of 99.6 volume percent purity, whereas in actuality a completely satisfactory operation is obtained with a make-up hydrogen stream containing only 58.3 volume percent hydrogen.

TABLE I

| Rates: | All examples |
| --- | --- |
| Oil charge b.p.h. | 1.707 |
| Prod. oil b.p.h. | 1.296 |
| Prod. tar b.p.h. | 0.461 |
| Hydrogen consump. s.c.f./bbl. fd. | 635 |
| Operating conditions: | |
| Oil-$H_2$ feed temp. ° F. | 861 |
| Stripper $H_2$ temp. ° F. | 853 |
| Stripper, twr. top ° F. | 848 |
| Catalyst reactor out ° F. | 800 |
| High press. sep. ° F. | 120 |
| Low press. sep. ° F. | 85 |

TABLE I—Continued

| | |
|---|---|
| High press. sep. p.s.i.g. | 1500 |
| Low press. sep. p.s.i.g. | 160 |
| Quality: | |
| Feed oil | Red. Calif. Crude |
| °API | 15.6 |
| Viscosity SSU–210° | 176 |
| Carbon residue percent | 9.09 |
| Sulfur wt. percent | 1.27 |
| Product oil: | |
| °API | 29.6 |
| Viscosity SSU–122° F. | 47.5 |
| Carbon residue | 0.10 |
| Sulfur wt. percent | 0.12 |
| Product tar: | |
| °API | 0.6 |
| Carbon residue percent | 31.7 |

TABLE II

| Rates and Quality | Ex. 1 | Ex. 2 | Ex. 3 |
|---|---|---|---|
| | Type of Operation | | |
| | Normal, with H₂ makeup after high press. separator | H₂ makeup prior to HP separator and recycle of LP separator liq. prod. to HP separator | H₂ makeup prior to HP separator and recycle of LP separator liq. through extractor twr. and back to LP separator |
| Makeup H₂ M s.c.f.h. | 1.203 | 1.998 | 1.998 |
| Vol. percent H₂ | 96.8 | 58.3 | 58.3 |
| Recycle H₂ M s.c.f.h. | 41.70 | | |
| Vol. percent H₂ | 81.3 | | |
| Total H₂ Strm. M s.c.f.h. | 42.90 | 42.48 | 42.46 |
| Vol. percent H₂ | 81.7 | 81.7 | 81.8 |
| H₂ Stream to Oil Htr. M s.c.f.h. | 17.62 | 17.20 | 17.18 |
| H₂ Stream to H₂ Heater M s.c.f.h. | 25.28 | 25.28 | 25.28 |
| Tail Gas M s.c.f.h. | 0.186 | 1.401 | 1.422 |
| LP Sep. Liq. Recycle b.p.h. | 0 | 12.96 | 12.96 |
| Ratio Recycle/Prod. Oil | | 10 | 10 |
| Effect of the Operation of the Invention is equivalent to supplying a makeup H₂ Stream in an operation like Example 1 of H₂ Purity of Vol. percent | | 97.4 | 99.6 |

TABLE III

| Gas Analyses | Ex. 1 | Ex. 2 | Ex. 3 |
|---|---|---|---|
| Recycle Gas, Vol. Percent: | | | |
| H₂ | 81.29 | No separate stream available | No separate stream available |
| N₂ | 1.60 | | |
| CO | 0.01 | | |
| H₂S | 0.98 | | |
| C₁ | 14.04 | | |
| C₂–C₅ | 2.08 | | |
| Makeup Gas, Vol. Percent: | | | |
| H₂ | 96.80 | 58.27 | 58.27 |
| N₂ | 0.56 | | |
| CO | 2.69 | | |
| H₂S | | | |
| C₁ | 0.45 | 21.46 | 21.46 |
| C₂–C₅ | | 20.27 | 20.27 |
| Total H₂ Stream, Vol. Percent: | | | |
| H₂ | 81.72 | 81.74 | 81.79 |
| N₂ | 1.57 | 1.53 | 1.53 |
| CO | 0.08 | 0.01 | 0.01 |
| H₂S | 0.95 | 0.67 | 0.66 |
| C₁ | 13.67 | 13.96 | 13.96 |
| C₂–C₅ | 2.01 | 2.09 | 2.05 |
| Tail Gas, Vol. Percent: | | | |
| H₂ | 21.94 | 26.71 | 26.35 |
| N₂ | 1.32 | 1.52 | 1.51 |
| CO | 0.01 | 0.01 | 0.01 |
| H₂S | 12.68 | 10.48 | 10.61 |
| C₁ | 23.50 | 28.29 | 28.04 |
| C₂–C₅ | 40.55 | 32.99 | 33.48 |

Obviously, many variations can be made in the invention as set forth without departing from the spirit and scope thereof. Hence only such limitations should be imposed as are indicated in the appended claims.

We claim:

1. In a process for the catalytic hydrogenation of hydrocarbons in the presence of an excess of hydrogen under conditions wherein there is a net consumption of hydrogen which process comprises:

passing said hydrocarbons and hydrogen over a hydrogenation catalyst in a hydrogenation reaction zone at elevated temperature and pressure and removing from said hydrogenation reaction zone a total effluent comprising unreacted hydrogen, normally gaseous hydrocarbons and liquid hydrocarbons, the improvement which comprises introducing into said effluent from an extraneous source impure make-up hydrogen containing normally gaseous hydrocarbons as impurities and thereby producing a mixture of total effluent and make-up hydrogen, conducting a first vapor-liquid separation of said mixture at essentially hydrogenation reaction zone pressure but below hydrogenation reaction zone temperature to produce an overhead hydrogen stream and a first bottoms stream comprising hydrogenated liquid hydrocarbons substantially saturated with normally gaseous hydrocarbons, conducting a second vapor-liquid separation of said first bottoms stream at a relatively lower pressure to produce a second overhead stream comprising essentially normally gaseous hydrocarbons and a second bottoms stream consisting essentially of gas-free liquid hydrocarbons, introducing a portion of said second bottoms stream of essentially gas-free liquid hydrocarbon into said mixture of effluent and make-up hydrogen, absorbing at least a portion of said normally gaseous hydrocarbon impurities in said second bottoms stream and producing during said first vapor-liquid separation an overhead hydrogen stream containing a decreased quantity of normally gaseous hydrocarbon impurities and returning said overhead hydrogen stream of decreased gaseous hydrocarbon content to said hydrogenation reaction zone.

References Cited

UNITED STATES PATENTS

| | | | |
|---|---|---|---|
| 2,952,626 | 9/1960 | Kelley et al. | 208—216 |
| 2,971,901 | 2/1961 | Halik et al. | 208—143 |
| 3,089,843 | 5/1963 | Eastman et al. | 208—143 |
| 3,095,367 | 6/1963 | Kline et al. | 208—89 |
| 2,883,337 | 4/1959 | Hartley et al. | 208—216 |

SAMUEL P. JONES, *Primary Examiner.*

DELBERT E. GANTZ, *Assistant Examiner.*

UNITED STATES PATENT OFFICE
CERTIFICATE OF CORRECTION

Patent No. 3,362,903                            January 9, 1968

Du Bois Eastman, deceased, by Security First National
    Bank, executor, et al.

It is certified that error appears in the above identified patent and that said Letters Patent are hereby corrected as shown below:

Column 2, line 5, "by electrolysis" should read -- by the electrolysis --; line 47, "heat" should read -- the --; line 54 "heating the" should read -- heating coil the --. Column 5, line 45, cancel "and vaporous hydrogen".

Signed and sealed this 23rd day of September 1969.

(SEAL)

Attest:

Edward M. Fletcher, Jr.

Attesting Officer

WILLIAM E. SCHUYLER, JR.

Commissioner of Patents